(12) United States Patent
Wang

(10) Patent No.: US 11,719,446 B2
(45) Date of Patent: Aug. 8, 2023

(54) AIR HANDLING APPARATUS

(71) Applicant: BEIJING XIAOMI MOBILE SOFTWARE CO., LTD., Beijing (CN)

(72) Inventor: Luxi Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 423 days.

(21) Appl. No.: 17/021,797

(22) Filed: Sep. 15, 2020

(65) Prior Publication Data

US 2021/0325053 A1 Oct. 21, 2021

(30) Foreign Application Priority Data

Apr. 17, 2020 (CN) .......................... 202010308119.0

(51) Int. Cl.
*B01D 46/00* (2022.01)
*B01D 46/44* (2006.01)
*B01D 46/46* (2006.01)
*B01D 46/88* (2022.01)
*F24F 11/39* (2018.01)
(Continued)

(52) U.S. Cl.
CPC ........ *F24F 1/0073* (2019.02); *B01D 46/0005* (2013.01); *B01D 46/0086* (2013.01); *B01D 46/2403* (2013.01); *B01D 46/4227* (2013.01); *B01D 46/444* (2013.01); *B01D 46/46* (2013.01); *B01D 46/88* (2022.01); *B01D 2265/028* (2013.01); *B01D 2265/04* (2013.01); *B01D 2265/06* (2013.01)

(58) Field of Classification Search
CPC ............ B01D 46/0005; B01D 46/0086; B01D 46/2403; B01D 46/46; B01D 46/88; B01D 2265/028; B01D 2265/04; B01D 2265/06; F24F 1/0073; F24F 11/39; F24F 11/526; F24F 13/28; F24F 8/10
USPC ..... 55/481, 484, 495, 497, DIG. 34; 96/417; 116/DIG. 25
See application file for complete search history.

(56) References Cited

U.S. PATENT DOCUMENTS 4,747,364 A * 5/1988 Horowitz ................ G01L 19/12
116/DIG. 25
5,205,156 A * 4/1993 Asano .................... B01D 46/46
340/607
(Continued)

FOREIGN PATENT DOCUMENTS

EP 0 947 781 A1 10/1999
EP 2 023 054 A1 2/2009
(Continued)

OTHER PUBLICATIONS

Extended European Search Report dated Feb. 25, 2021 in European Patent Application No. 20198082.8, 9 pages.

*Primary Examiner* — Minh Chau T Pham
(74) *Attorney, Agent, or Firm* — Oblon, McClelland, Maier & Neustadt, L.L.P.

(57) ABSTRACT

An air handling apparatus is provided. The air handling apparatus can include a shell, a filter plate, a filter chamber, and a filter. The shell is provided with a hole. The filter plate is connected to the shell through a first connecting member and configured to cover the hole. The filter chamber is arranged in the shell and communicated with the hole. The filter is inserted in the filter chamber through the hole. A cross-sectional size of the filter is less than or equal to a cross-sectional size of the hole.

18 Claims, 4 Drawing Sheets

(51) Int. Cl.
*F24F 11/526* (2018.01)
*F24F 1/0073* (2019.01)
*B01D 46/24* (2006.01)
*B01D 46/42* (2006.01)

(56) References Cited

U.S. PATENT DOCUMENTS

| | | | | |
|---|---|---|---|---|
| 5,236,478 | A | * 8/1993 | Lewis | B01D 46/10 55/495 |
| 5,494,497 | A | * 2/1996 | Lee | F02M 35/024 55/497 |
| 7,465,327 | B2 | * 12/2008 | Jang | B01D 46/0039 62/331 |
| 7,887,614 | B2 | * 2/2011 | Yamazaki | B01D 46/46 96/417 |
| 9,696,703 | B2 | * 7/2017 | Hauville | F24F 7/06 |
| 2009/0165432 | A1 | 7/2009 | Yabu et al. | |
| 2010/0294134 | A1 | 11/2010 | Yokomizo et al. | |
| 2011/0211170 | A1 | * 9/2011 | Hagino | G03B 21/14 55/483 |
| 2013/0180221 | A1 | * 7/2013 | Peteln | B01D 47/00 55/484 |
| 2013/0232931 | A1 | * 9/2013 | Malcolm | B01D 46/0006 55/481 |
| 2017/0115028 | A1 | 4/2017 | Lee et al. | |
| 2017/0284697 | A1 | 10/2017 | Lee et al. | |
| 2020/0217556 | A1 | 7/2020 | Lee et al. | |
| 2020/0363097 | A1 | 11/2020 | Lee et al. | |

FOREIGN PATENT DOCUMENTS

| | | |
|---|---|---|
| EP | 2 246 637 A1 | 11/2010 |
| EP | 3 163 177 A1 | 5/2017 |
| WO | WO 2018/0218983 A1 | 12/2018 |

* cited by examiner

AIR HANDLING APPARATUS

CROSS-REFERENCES TO RELATED APPLICATION

This application is based on and claims priority to Chinese Patent Application No. 202010308119.0, filed on Apr. 17, 2020, the entire content of which is incorporated herein by reference.

TECHNICAL FIELD

The present disclosure relates to a field of air handling technology including an air handling apparatus.

BACKGROUND

An air conditioner refers to a kind of apparatus configured to regulate and control a temperature, a humidity, a flow rate, and other parameters of an ambient air in buildings or structures through artificial means. Generally, the air conditioner includes several mains parts, such as a cold source apparatus/a heat source apparatus, a cold and hot medium transmission and distribution system, a terminal device, and other auxiliary apparatus. The air conditioner mainly includes a cooling host, a water pump, a fan, and a pipeline system. The terminal device is configured for using the transmitted and distributed cold energy and heat energy to specifically deal with an air state, such that the air parameters of a target environment can meet the requirements. A filter can be used to filter air such that the air has certain cleanliness, and the filter needs to be replaced after being used for a period of time. Often, the filter of the air conditioner in the related art is not easy to replaced and needs to be replaced by professional technical personnel, so a cost for replacing the filter is high.

SUMMARY

Embodiments of the present disclosure provide an air handling apparatus. The air handling apparatus can include a shell, a filter plate, a filter chamber, and a filter. The shell is provided with a hole. The filter plate is connected to the shell through a first connecting member and configured to cover the hole. The filter chamber is arranged in the shell and communicated with the hole. The filter is inserted in the filter chamber through the hole. A cross-sectional size of the filter is less than or equal to a cross-sectional size of the hole.

Other features and advantages of the present disclosure will be illustrated in subsequent specifications, and partly becomes apparent from the description or is appreciated by the implementation of the present disclosure. The object and other advantages of the present disclosure can be achieved and obtained by a structure specially pointed out in the description and the drawings.

The technical solution of the present disclosure is further described in detail with reference to the drawings and exemplary embodiments.

BRIEF DESCRIPTION OF THE DRAWINGS

The accompanying drawings, which constitute a part of this specification, is used to provide a further understanding of exemplary embodiments of the present disclosure, together with the description, serve to explain the principles of the disclosure, and cannot be constituted as a limitation to the present disclosure.

DETAILED DESCRIPTION

The exemplary embodiments of the present disclosure will be described below with reference to the accompanying drawings. It should be understood that the exemplary embodiments described herein are merely used to illustrate and explain the present disclosure, and cannot be construed as a limitation to the present disclosure.

Figure 1:
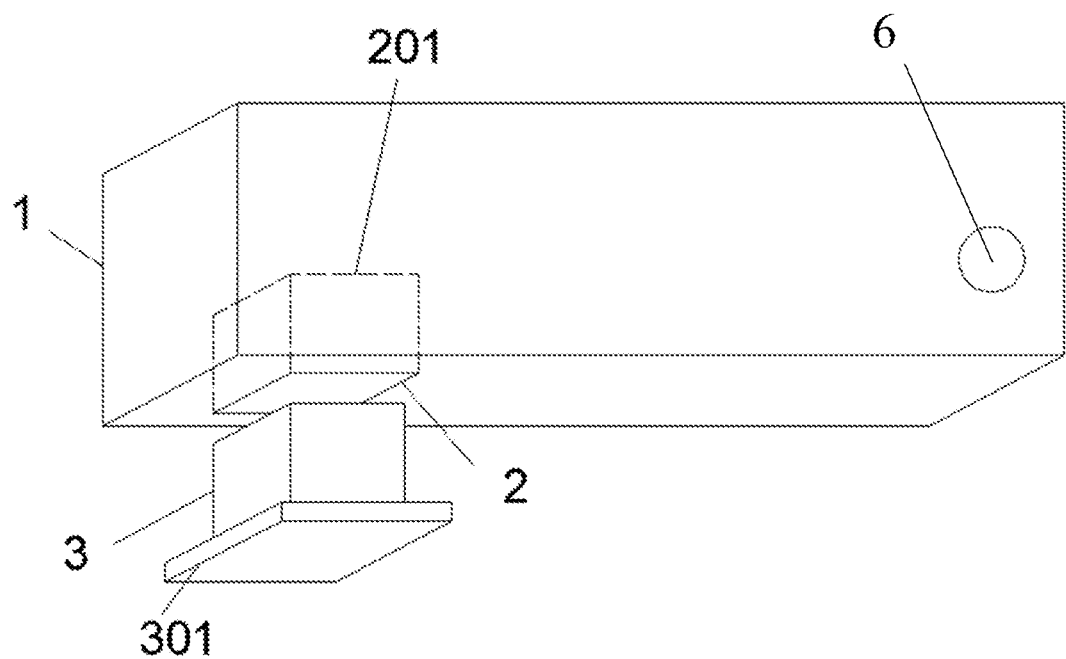
FIG. 1 is a schematic view of an air handling apparatus according to an embodiment of the present disclosure.

Embodiments of the present disclosure provide an air handling apparatus. As illustrated in FIG. 1, the air handling apparatus includes a shell 1 and a filter plate 301, and a hole 2 is formed in the shell 1. The filter plate 301 is mounted to the shell 1 through a first connecting member and configured to cover the hole 2. The hole 2 is communicated with a filter chamber 201 inside the air handling apparatus, and the filter 3 is inserted in the filter chamber 201 through the hole 2. A cross-sectional size of the filter 3 does not exceed a cross-sectional size of the hole 2. The filter 3 and the filter chamber 201 are connected through a second connecting member. The filter 3 and the filter plate 301 are connected through a third connecting member. Each of the first connecting member, the second connecting member and the third connecting member is one of a snap structure, an adhesive structure and an adsorption structure.

The snap structure can be configured to connect two parts via a snap fit, the adhesive structure is configured to connect two parts by adhering, and the adsorption structure is connect two parts by adsorption. Further, these structures are not exclusively limited herein, while any well-known structures having similar functions in the related art can be used in embodiments of the present disclosure.

For example, the snap structure may include an elastic member on one of the two parts and a groove in the other one of the two parts, the elastic member includes a hook or a protrusion, and the hook or the protrusion is configured to be engaged in the groove such that the two parts can be connected together. Further, the adhesive structure may include two adhesive layers arranged on the two parts, respectively, and the two adhesive layers are configured to be mutually adhered such that the two parts can be connected together. Moreover, the adsorption structure may be a velcro and include a hook surface and a loop surface on the two parts, respectively, and the hook surface is configured to be attached to the loop surface, such that the two parts can connected together.

For example, the hole 2 is formed in a bottom panel of the shell 1, the third connecting member is a bracket arranged on the filter plate 301, and the filter 3 is arranged in the bracket and inserted in the filter chamber 201 together with the bracket. The first connecting member is a snap structure, and the filter plate 301 is connected to the bottom panel of the shell 1 through the snap structure. A cross section of the filter 3 has a rectangular shape, and the filter 3 has a cuboid shape.

The above technical solution has following working principles and beneficial technical effects. When the filter needs to be replaced, the filter 3 is pulled out of the hole 2, and a new filter 3 is taken. Then, the new filter 3 is mounted to the filter plate 301, and the filter plate 301 is inserted into the hole 2. In this way, the replacement of the filter is quickly completed, such that the filter replacement is faster and more convenient.

Figure 2:
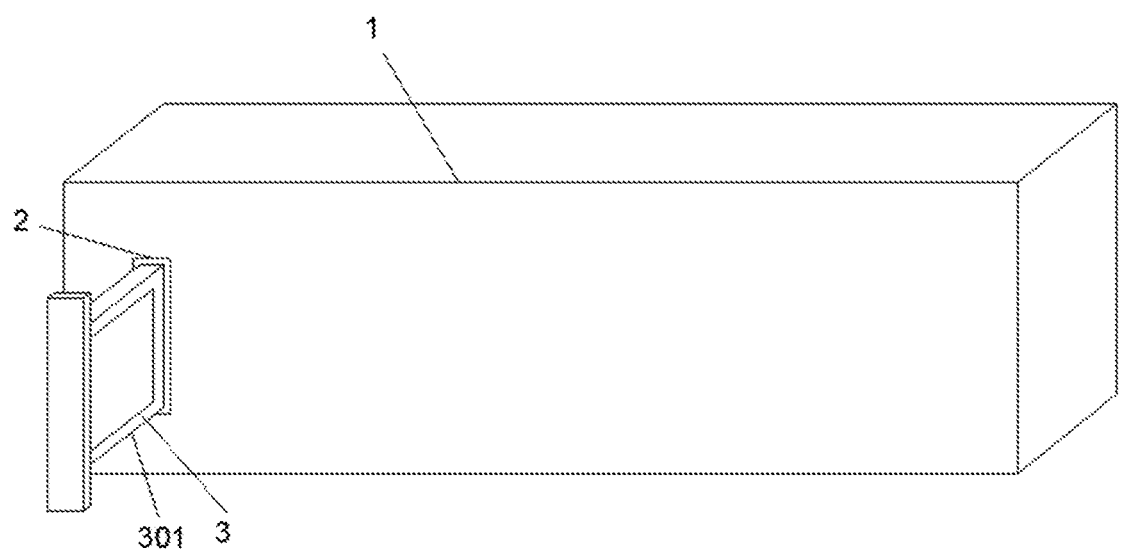
FIG. 2 is a schematic view of an air handling apparatus according to another embodiment of the present disclosure, in which a filter is oriented in a vertical direction.
Figure 3:
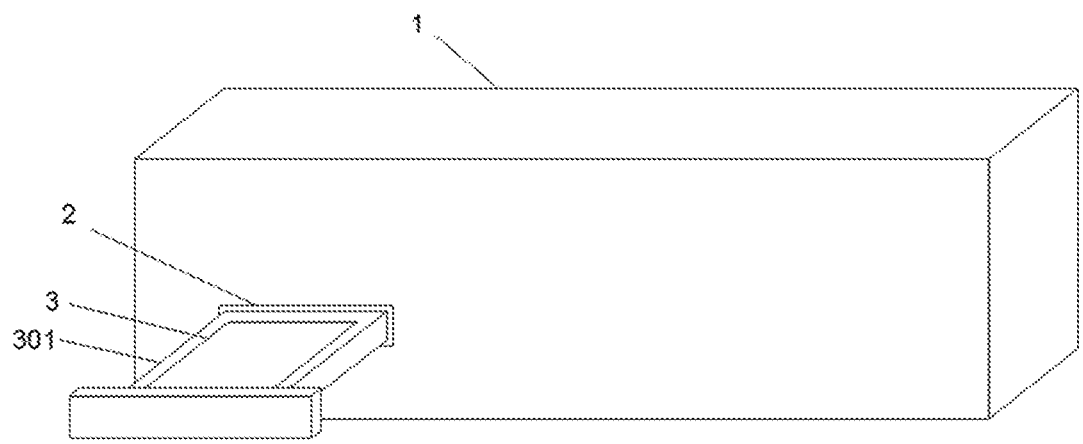
FIG. 3 is a schematic view of an air handling apparatus according to another embodiment of the present disclosure, in which a filter is oriented in a horizontal direction.

As illustrated in FIGS. 2-3, in another exemplary embodiment of the present disclosure, the hole 2 is formed in a front panel of the shell 1, a size of the filter plate 301 matches with a size of one of surfaces of the filter 3, and a material of the filter plate 301 is identical with that of the front panel of the shell 1. The third connecting member is a receptacle fixed on the filter plate 301, and the filter 3 is arranged in the receptacle and inserted in the filter chamber 201 together with the receptacle.

In another exemplary embodiment of the present disclosure, the hole 2 is formed in the front panel of the shell 1, the size of the filter plate 301 matches with the size of one of the surfaces of the filter 3, and the material of the filter plate 301 is identical with that of the front panel of the shell 1. The third connecting member is an adhesive structure or a snap structure, and the filter 3 and the filter plate 301 are connected as a whole through the adhesive structure or the snap structure.

A direction of the hole 2 may be a horizontal direction or a vertical direction. That is, the hole 2 may extend in the vertical direction as illustrated in FIG. 2, and the filter 3 may also be oriented in the vertical direction accordingly; or, the hole 2 may extend in the horizontal direction as illustrated in FIG. 3, and the filter 3 may also be oriented in the horizontal direction accordingly.

Figure 4:
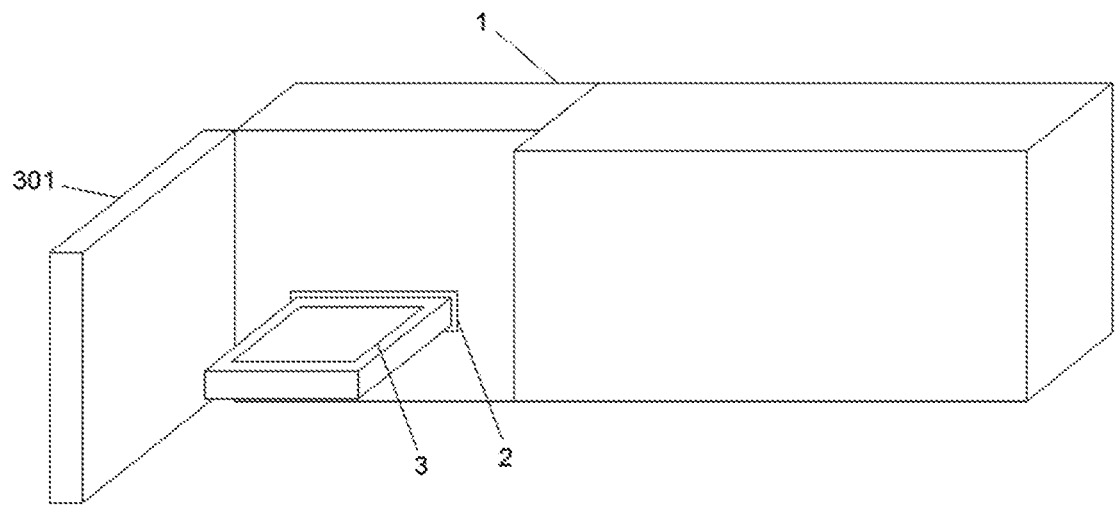
FIG. 4 is a schematic view of an air handling apparatus according to another embodiment of the present disclosure.

As illustrated in FIG. 4, in another exemplary embodiment of the present disclosure, the hole 2 is formed in the front panel of the shell 1, a first side edge of the filter plate 301 is connected with the shell 1 through a hinge, and at least one second side edge of the filter plate 301 is movably connected with the front panel of the shell 1 through the first connecting member. The filter 3 is inserted into the filter chamber 201 through the hole 2 and connected in the filter chamber 201 through the second connecting member.

Figure 5:
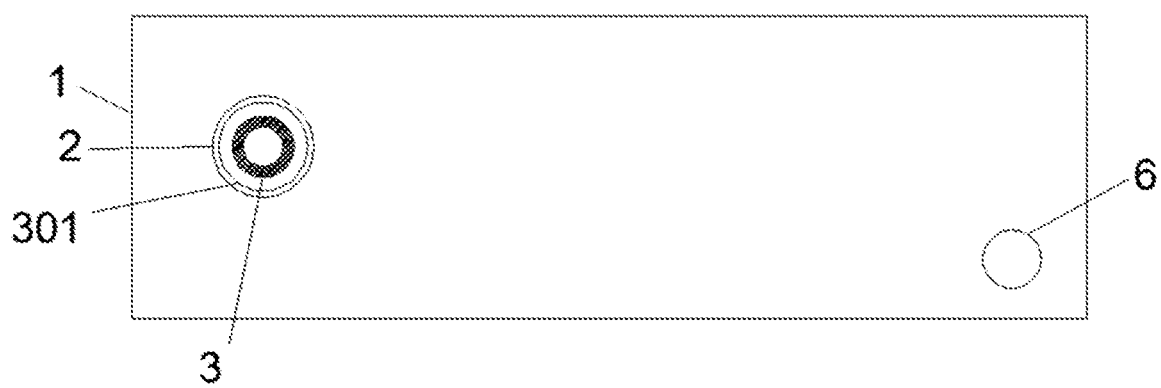
FIG. 5 is a schematic view of an air handling apparatus according to another embodiment of the present disclosure.

As illustrated in FIG. 5, in another exemplary embodiment of the present disclosure, the hole 2 is formed in the front panel of the shell 1, a cross section of the hole 2 has a circular shape, and the filter 3 has a cylindrical shape. The third connecting member is a bracket arranged on the filter plate 301, and the filter 3 is arranged in the bracket and inserted in the filter chamber 201 together with the bracket. The second connecting member is a snap structure, and the filter 3 is configured to be rotated into a snap fit with the filter chamber 201 through the snap structure. In this case, the filter 3 may have outer threads in its outer surface, and the filter chamber 201 may have inner threads in its inner surface, such that the filter 3 can be screwed into the filter chamber 201 through the fit of the outer threads and the inner threads, and finally snapped in the filter chamber 201 through the snap structure.

Figure 6:
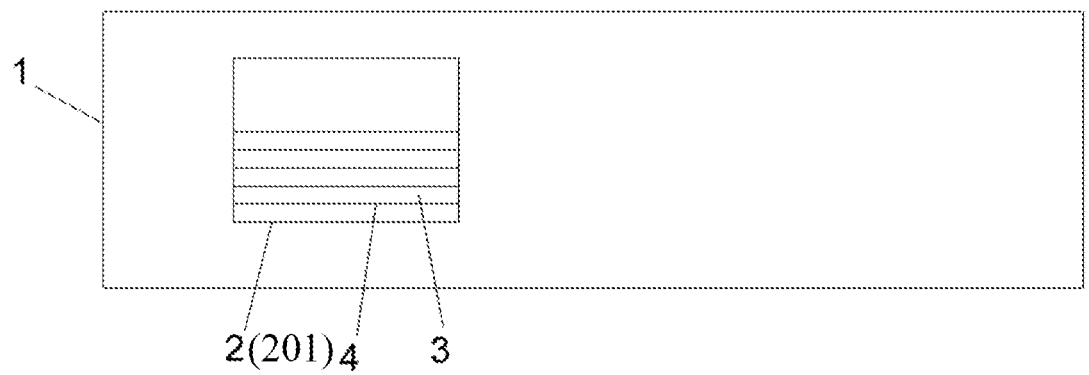
FIG. 6 is a schematic view of an air handling apparatus according to another embodiment of the present disclosure.

As illustrated in FIG. 6, in another embodiment of the present disclosure, a plurality of slots 4 are formed in the filter chamber 201, and the filter 3 is inserted in the slot 4 through the hole 2. The plurality of slots 4 are arranged in the filter chamber 201, such that when the slot 4 in which the filter 3 is inserted is damaged, the filter 3 may be displaced to another undamaged slot 4, or a new filter 3 may be mounted in another undamaged slot 4, thus improving a service life of the filter chamber 201.

Figure 7:
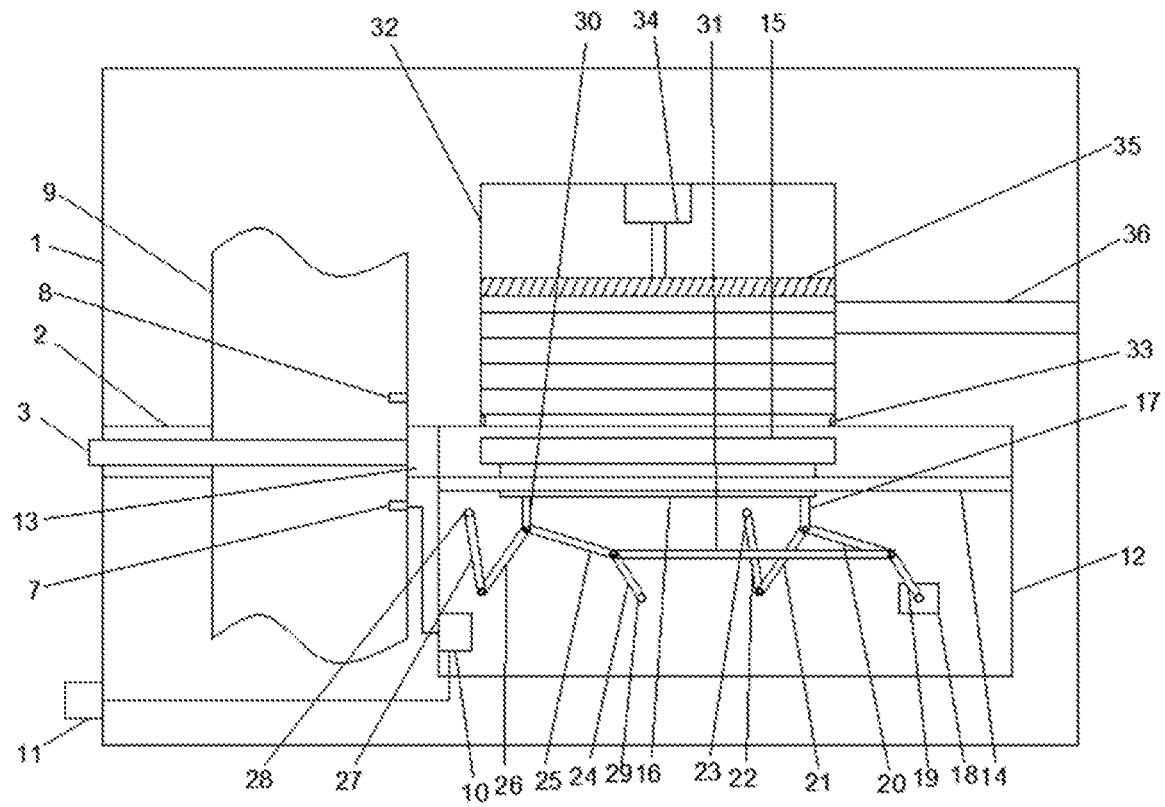
FIG. 7 is a schematic view of an automatic filter-replacement device of an air handling apparatus according to an embodiment of the present disclosure.

As illustrated in FIG. 7, in some embodiments of the present disclosure, the air handling apparatus further includes a filter-replacement reminding device. The filter-replacement reminding device can include a first air speed sensor 7 and a second air speed sensor 8 arranged on both sides of the hole 2, respectively. The air handling apparatus further includes an air purification duct 9 where the air is purified. The air purification duct 9 includes the filter chamber 201, and hence the filter 3 is received in the air purification duct 9, such that the air is purified by the filter 3 in the air purification duct 9. The first air speed sensor 7 and the second air speed sensor 8 are both mounted on an inner wall of the air purification duct 9. The shell 1 is further provided with a single-chip microcomputer 10 therein, and is further provided with an alarm 11 on an outer wall thereof. The first air speed sensor 7 and the second air speed sensor 8 are electrically connected with the single-chip microcomputer 10, respectively. The single-chip microcomputer 10 is electrically connected with the alarm 11.

The first air speed sensor 7 and the second air speed sensor 8 can detect air speeds on both sides of the filter 3, respectively. When the filter 3 is used for a period of time, the filter 3 is blocked, thus causing a difference between the air speeds on the two sides of the filter 3 to increase. When the difference exceeds an alarm value, the single-chip microcomputer 10 will turn on the alarm 11 to generate a warning sound, so as to remind a person to replace the filter 3 in time.

Figure 8:
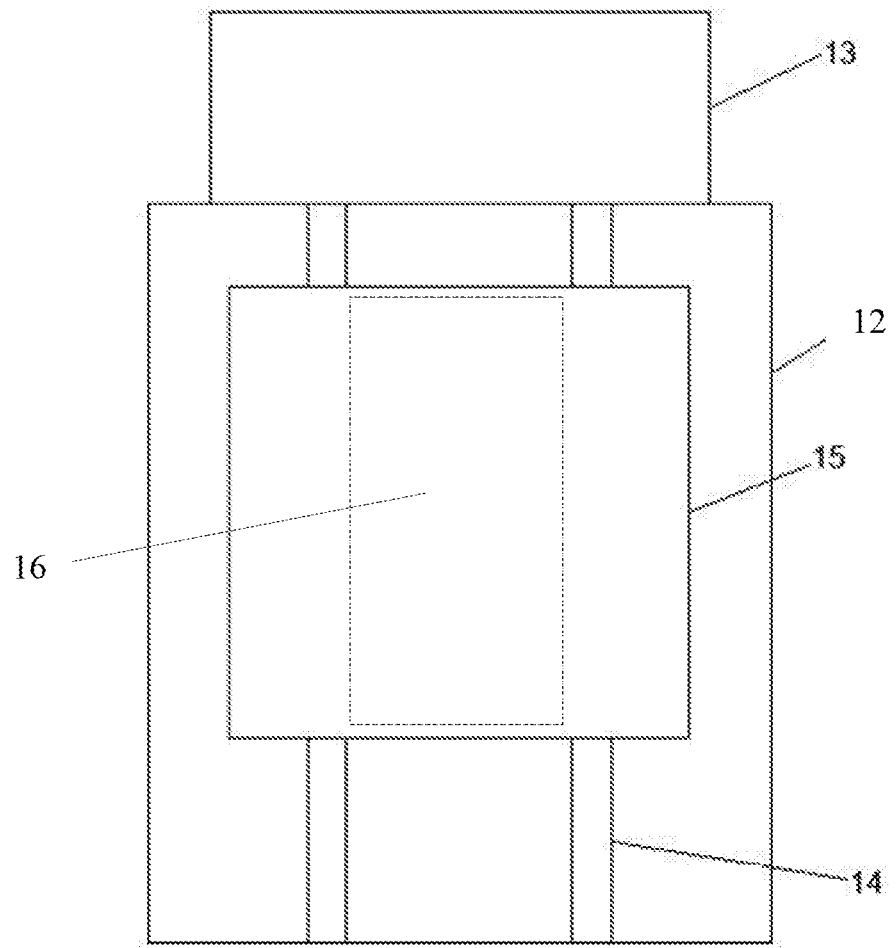
FIG. 8 is a schematic view of a substitution filter and a support plate of an air handling apparatus according to an embodiment of the present disclosure.

As illustrated in FIGS. 7-8, in some embodiments of the present disclosure, the air handling apparatus further includes an automatic filter-replacement device. The automatic filter-replacement device includes a cavity 12 arranged in the shell 1 and located at a side of the air purification duct 9 away from the hole 2. The cavity 12 is communicated with the air purification duct 9 through a channel 13, and the channel 13 and the hole 2 are arranged on the same plane, i.e. central axes of the channel 13 and the hole 12 are arranged on the same plane. Two support plates 14 extending in a horizontal direction are arranged in the cavity 12, and two ends of the support plate 14 are fixedly connected with inner walls of the cavity 12, respectively.

The automatic filter-replacement device further includes a substitution filter 15 arranged on the two support plates 14, and a conveying plate 16 arranged under the substitution filter 15 and oriented in the horizontal direction. The conveying plate 16 is located between the two support plates 14 and configured to drive the substitution filter 15 to move together. A first support rod 17 and a second support rod 30 are arranged to a bottom of the conveying plate 16, and are symmetrical in the horizontal direction with respect to a horizontal centerline of the conveying plate 16. The first support rod 17 and the second support rod 30 are oriented in the vertical direction.

The automatic filter-replacement device further includes a motor 18 arranged on the inner wall of the cavity 12, and electrically connected with the single-chip microcomputer 10. An output shaft of the motor 18 is perpendicular to and connected with an end of a first rotating rod 19, another end of the first rotating rod 19 is connected with an end of a first connecting rod 20, and another end of the first connecting rod 20 is fixedly connected with an end of a second connecting rod 21. A preset included angle is formed between the first connecting rod 20 and the second connecting rod 21, and the included angle ranges from 60° to 80°. A lower end of the first support rod 17 is hinged with an intersection of the first connecting rod 20 and the second connecting rod 21, another end of the second connecting rod 21 is connected with an end of a first swing rod 22, another end of the first swing rod 22 is hinged with an end of a first fixed rod 23, and another end of the fixed rod 23 is connected with an inner wall of the cavity 12.

The automatic filter-replacement device further includes a second rotating rod 24, a third connecting rod 25, a fourth connecting rod 26, a second swing rod 27, a second fixed rod 28 similar or even identical to the first rotating rod 19, the first connecting rod 20, the second connecting rod 21, the first swing rod 22 and the first fixed rod 23, respectively. A lower end of the second support rod 30 is hinged with an intersection of the third connecting rod 25 and the fourth connecting rod 26. An end of a third fixed rod 29 is rotatably connected with an end of the second rotating rod 24 away from the third connecting rod 25, an another end of the third fixed rod 29 is connected with the inner wall of the cavity 12. The second rotating rod 24 is perpendicular to the third fixed rod 29. An end of a link rod 31 is hinged with the end of the first rotating rod 19 away from the motor 18, and another end of the link rod 31 is hinged with an end of the second rotating rod 24 away from the third fixed rod 29.

When the single-chip microcomputer 10 detects the need to replace the filter, the motor 18 is turned on and drives the first rotating rod 19 to rotate, the first rotating rod 19 drives the first connecting rod 20 and the second connecting rod 21 to move together, and the second connecting rod 21 drives the first swing rod 22 to swing. Since the link rod 31 connects the first rotating rod 19 with the second rotating rod 24, the second rotating rod 24 rotates synchronously, and the third connecting rod 25, the fourth connecting rod 26 and the second swing rod 27 also move synchronously, such that the first support rod 17 and the second support rod 30 are always in a same horizontal position during the movement. The conveying plate 16 continuously performs a translation motion, i.e. moving leftwards, such that the substitution filter 15 also continuously moves leftwards, passes through the channel 13, and finally is mounted in the air purification duct 9 to push the used filter 3 out of the hole 2. Thus, the automatic replacement of the filter is completed.

As illustrated in FIG. 7, in some embodiments, the air handling apparatus further includes a filter supplement device. The filter supplement device can include a storage tank 32 arranged above the cavity 12, and communicated with the cavity 12. An elastic bump 33 is provided on an inner wall of the storage tank 32 adjacent to a bottom thereof, and a plurality of filters are stored in the storage tank 32 and arranged above the elastic bump 33. A side wall of the shell 1 is provided with a filter input hole 36, and the filter input hole 36 is communicated with an upper end of the storage tank 32.

The filter supplement device further includes an electric push rod 34 arranged to a top of the storage tank 32, and the electric push rod 34 faces downwards and is connected with a pressing plate 35. The electric push rod 34 is electrically connected with the single-chip microcomputer 10.

After the replacement of the filter 15, the single-chip microcomputer 10 turns on the electric push rod 34 and hence the electric push rod 34 moves downwards, such that the pressing plate 35 presses the filter in the storage tank 32 downwards, and thus the filter squeezes through the elastic bump 33 and falls onto the support plate 14 in the cavity 12 for standby use. By controlling a movement distance of the electric push rod 34, one filter can be fed into the cavity 12 each time. When the filter in the storage tank 32 is run out, the filter can be supplemented into the storage tank 32 through the filter input hole 36.

In some embodiments of the present disclosure, as illustrated in FIGS. 1 and 5, the air handling apparatus further includes a temperature display 6 on the outer wall of the shell 1. The temperature display 6 is configured to indicate an operation temperature of the air handling apparatus.

Obviously, those skilled in the art can make various changes and modifications to the present disclosure without departing from the spirit and scope thereof. Thus, if these changes and modifications of the present disclosure fall within the scope of the claims of the present disclosure and the equivalent technologies, the present disclosure also intends to include these changes and modifications.

The invention claimed is:

1. An air handling apparatus, comprising:
a shell provided with a hole;
a filter plate that is connected to the shell through a first connecting member and configured to cover the hole;
a filter chamber that is arranged in the shell that is in communication with the hole; and
a filter that is inserted in the filter chamber through the hole, a cross-sectional size of the filter being less than or equal to a cross-sectional size of the hole,
the air handling apparatus further comprises an air purification duct including the filter chamber, and the filter being received in the air purification duct,
the air handling apparatus further includes a filter-replacement reminding device that comprises:
a first air speed sensor and a second air speed sensor that are arranged on both sides of the hole, respectively, both the first air speed sensor and the second air speed sensor being mounted on an inner wall of the air purification duct;
a single-chip microcomputer that is arranged in the shell and electrically connected with the first air speed sensor and the second air speed sensor; and
an alarm that is arranged on an outer wall of the shell and electrically connected with the single-chip microcomputer,
wherein the first air speed sensor and the second air speed sensor are configured to detect air speeds on both sides of the filter, respectively, and the single-chip microcomputer is configured to turn on the alarm to generate a warning sound when a difference between the air speeds on the two sides of the filter exceeds an alarm value.

2. The air handling apparatus according to claim 1, wherein the filter and the filter chamber are connected through a second connecting member.

3. The air handling apparatus according to claim 1, wherein the filter and the filter plate are connected through a third connecting member.

4. The air handling apparatus according to claim 2, wherein each of the first connecting member and the second connecting member is one of a snap structure, an adhesive structure, and an adsorption structure.

5. The air handling apparatus according to claim 3, wherein each of the first connecting member and the third connecting member is one of a snap structure, an adhesive structure, and an adsorption structure.

6. The air handling apparatus according to claim 3, wherein the hole is formed in a bottom panel of the shell, the third connecting member is a bracket arranged on the filter plate, and the filter is arranged in the bracket.

7. The air handling apparatus according to claim 6, wherein the first connecting member is a snap structure, and the filter plate is connected to the bottom panel of the shell through the snap structure.

8. The air handling apparatus according to claim 3, wherein the hole is formed in a front panel of the shell, a size of the filter plate matches with a size of one of surfaces of the filter, a material of the filter plate is identical with a material of the front panel of the shell, the third connecting member is a receptacle fixed on the filter plate, and the filter is arranged in the receptacle and inserted in the filter chamber together with the receptacle.

9. The air handling apparatus according to claim 3, wherein the hole is formed in a front panel of the shell, a size of the filter plate matches with a size of one of the surfaces of the filter, a material of the filter plate is identical with a material of the front panel of the shell, the third connecting member is an adhesive structure or a snap structure, and the filter and the filter plate are connected as a whole through the adhesive structure or the snap structure.

10. The air handling apparatus according to claim 2, wherein the hole is formed in a front panel of the shell, a first side edge of the filter plate is connected with the shell through a hinge, at least one second side edge of the filter plate is movably connected with the front panel of the shell through the first connecting member, and the filter is inserted in the filter chamber by the second connecting member.

11. The air handling apparatus according to claim 3, wherein the hole is formed in a front panel of the shell, a cross section of the hole has a circular shape, the filter has a cylindrical shape, the third connecting member is a bracket arranged on the filter plate, and the filter is arranged in the bracket and inserted in the filter chamber.

12. The air handling apparatus according to claim 2, wherein the hole is formed in a front panel of the shell, a cross section of the hole has a circular shape, the filter has a cylindrical shape, the second connecting member is a snap structure, and the filter is configured to be rotated to be snapped in the filter chamber by the snap structure.

13. The air handling apparatus according to claim 1, wherein a plurality of slots are formed in the hole and the filter is inserted in the slot.

14. The air handling apparatus according to claim 1, further comprising a temperature display arranged on an outer wall of the shell, and the temperature display being configured to indicate an operation temperature of the air handling apparatus.

15. The air handling apparatus according to claim 1, further including an automatic filter-replacement device that comprises:
 a cavity that is arranged in the shell and located at a side of the air purification duct away from the hole, the cavity being communicated with the air purification duct through a channel, and the channel and the hole being arranged on a same plane;
 two support plates extending in a horizontal direction that are arranged in the cavity, and two ends of each support plate being fixedly connected with inner walls of the cavity, respectively;
 a substitution filter that is arranged on the two support plates; and
 a conveying plate that is arranged under the substitution filter and between the two support plates, and configured to drive the substitution filter to move together.

16. The air handling apparatus according to claim 15, wherein the automatic filter-replacement device further comprises:
 a first support rod and a second support rod that are arranged on a bottom of the conveying plate and are symmetrical in the horizontal direction with respect to a horizontal centerline of the conveying plate, the first support rod and the second support rod being oriented in a vertical direction;
 a motor that is arranged on the inner wall of the cavity, and electrically connected with the single-chip microcomputer, the motor having an output shaft;
 a first rotating rod having an end perpendicular to and connected with the output shaft of the motor;
 a first connecting rod having an end connected with another end of the first rotating rod;
 a second connecting rod having an end fixedly connected with another end of the first connecting rod, a lower end of the first support rod being hinged with an intersection of the first connecting rod and the second connecting rod;
 a first swing rod having an end connected with another end of the second connecting rod; and
 a first fixed rod having an end hinged with another end of the first swing rod and another end connected with the inner wall of the cavity.

17. The air handling apparatus according to claim 16, wherein the automatic filter-replacement device further comprises:
 a second rotating rod, a third connecting rod, a fourth connecting rod, a second swing rod, and a second fixed rod that are similar to the first rotating rod, the first connecting rod, the second connecting rod, the first swing rod, and the first fixed rod, respectively, wherein a lower end of the second support rod is hinged with an intersection of the third connecting rod and the fourth connecting rod;
 a third fixed rod having an end rotatably connected with an end of the second rotating rod away from the third connecting rod, and an another end connected with the inner wall of the cavity, the second rotating rod being perpendicular to the third fixed rod; and
 a link rod having an end hinged with the end of the first rotating rod away from the motor and another end hinged with an end of the second rotating rod away from the third fixed rod.

18. The air handling apparatus according to claim 15, further including a filter supplement device that comprises:
 a storage tank that is arranged above the cavity and in communication with the cavity;
 an elastic bump that is provided on an inner wall of the storage tank adjacent to a bottom thereof, and a plurality of the filters being stored in the storage tank and arranged above the elastic bump;
 an electric push rod that is arranged on a top of the storage tank, oriented downwards, and electrically connected with the single-chip microcomputer;
 a pressing plate that is connected with the electric push rod; and
 a filter input hole that is formed in a side wall of the shell and in communication with an upper end of the storage tank.

* * * * *